US008166207B2

(12) United States Patent
White

(10) Patent No.: US 8,166,207 B2
(45) Date of Patent: Apr. 24, 2012

(54) QUERYING A DEVICE FOR INFORMATION

(75) Inventor: Bryan R. White, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 240 days.

(21) Appl. No.: 12/286,187

(22) Filed: Sep. 29, 2008

(65) Prior Publication Data

US 2010/0082852 A1     Apr. 1, 2010

(51) Int. Cl.
*G06F 3/00* (2006.01)
*G06F 13/00* (2006.01)

(52) U.S. Cl. ............ 710/5; 710/8; 710/31; 710/33

(58) Field of Classification Search ............... None
See application file for complete search history.

(56) References Cited

U.S. PATENT DOCUMENTS

| 7,464,207 | B2 * | 12/2008 | Riley et al. | 710/113 |
| 2004/0028199 | A1 * | 2/2004 | Carlson | 379/93.21 |
| 2009/0210637 | A1 * | 8/2009 | Yung et al. | 711/154 |
| 2010/0122009 | A1 * | 5/2010 | Kurihara | 710/311 |

FOREIGN PATENT DOCUMENTS

| JP | 07-049855 | 2/1995 |
| JP | 10-207812 | 8/1998 |
| JP | 2002-358251 | 12/2002 |
| JP | 2006-215873 | 8/2006 |

OTHER PUBLICATIONS

United Kingdom Intellectual Property Office, Examination Report Under Section 18(3) issued on Dec. 6, 2010 in U.K. patent application No. GB0916679.4.

Japanese Patent Office, Office Action mailed Jul. 16, 2011 in Japanese application No. 2009-222876.

* cited by examiner

*Primary Examiner* — Tariq Hafiz
*Assistant Examiner* — Scott Sun
(74) *Attorney, Agent, or Firm* — Trop, Pruner & Hu, P.C.

(57) ABSTRACT

In one embodiment, the present invention includes a method for receiving in a processor complex a first write request from a peripheral device, obtaining information of the processor complex responsive to the first write request, and transmitting a second write request from the processor complex to the peripheral device including the information. Other embodiments are described and claimed.

14 Claims, 6 Drawing Sheets

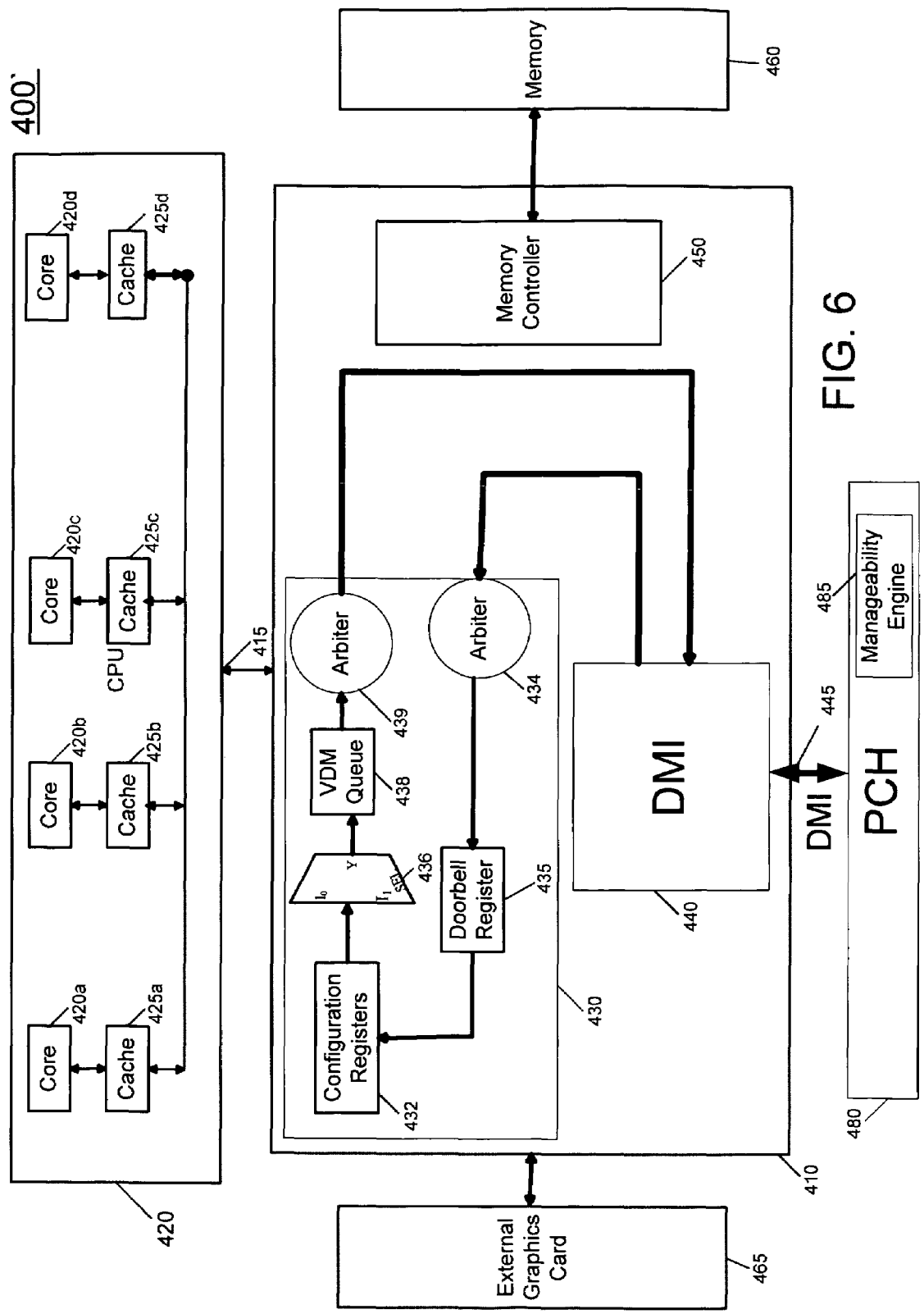

QUERYING A DEVICE FOR INFORMATION

BACKGROUND

In modern computer systems, various components communicate with each other according to a given communication protocol. For example, a peripheral device may communicate with a processor of a system via an intermediate interface such as a controller hub coupled between the device and processor. An example form of such communication is according to a so-called Peripheral Component Interconnect Express (PCI Express™ (PCIe™)) communication protocol.

Typical transactions include write and read transactions, interrupts and so forth. Typically, read transactions are used by a peripheral device to obtain data from a memory. However, such devices generally do not communicate read transactions directly to a processor, such as to query information regarding the processor. This is so, as it is unnatural and difficult to allow such a query, as an in-out dependency would occur and further would raise ordering issues in the processor. Thus while a processor may include various identification information such as processor identifier (ID) information, fusing information, state information or configuration information regarding its capabilities and so forth, it is generally difficult or impossible for devices coupled to the processor to obtain such information.

BRIEF DESCRIPTION OF THE DRAWINGS

FIG. 6 is a block diagram of a system in accordance with another embodiment of the present invention.

DETAILED DESCRIPTION

In various embodiments, in order to enable devices coupled to a processor complex to obtain information directly from the processor complex, a data flow including write-write transactions may be accommodated. Specifically, register access vendor defined messages (RAVDMs, or in short VDMs) of a write transaction from a device such as a peripheral device may be used to request information from the processor complex. Responsive to this write request, the processor complex may obtain and provide the requested information back to the peripheral device, using a similar write request transaction. In this way, complexities associated with a read request can be avoided. Such complexities include data dependency issues, as well as ordering issues. Still further, such reads to a processor generally do not occur, as a memory controller or other controller device do not provide for peer cycles to allow reads to internal devices of a processor complex. Historically, upstream configuration read/write (R/W) accesses from a peripheral device to a root (e.g., processor) complex have not been supported.

In one embodiment, such write-write transactions may be used with usage models to obtain configuration information regarding a processor complex, such as may occur during power up or initialization of a system. Specifically, in one such implementation a peripheral controller hub (PCH) may request so-called stock keeping unit (SKU) information that is associated with the processor complex. Such SKU information may provide details regarding a processor's configuration as it is configured at the factory. That is, certain processors may be manufactured having various features such as a number of cores, available operating frequencies, additional functional units, modes of operation and so forth. However, during manufacture different processors may be configured differently. For example, programmable fuses may be used to have only certain portions of a given processor's functionality enabled. In this way, a manufacturer can easily fabricate many lots of devices having the same semiconductor processing operations (e.g., masks and so forth) and then in the factory, each processor may be individually programmed to enable/disable various features. In this way, the commonly manufactured devices can be sold at different price levels depending on the enabled features.

Thus in some use models, a PCH or other peripheral device coupled to such a processor may, upon startup, seek to determine the processor's capabilities. Thus using write-write transactions in accordance with an embodiment of the present invention, the peripheral device can obtain the configuration and capability information, which may include ID information, such as processor vendor, processor type (i.e., segment targeted), processor generation (i.e., year produced), features enabled/disabled, maximum power dissipated, typical latencies, and so forth.

Figure 1:
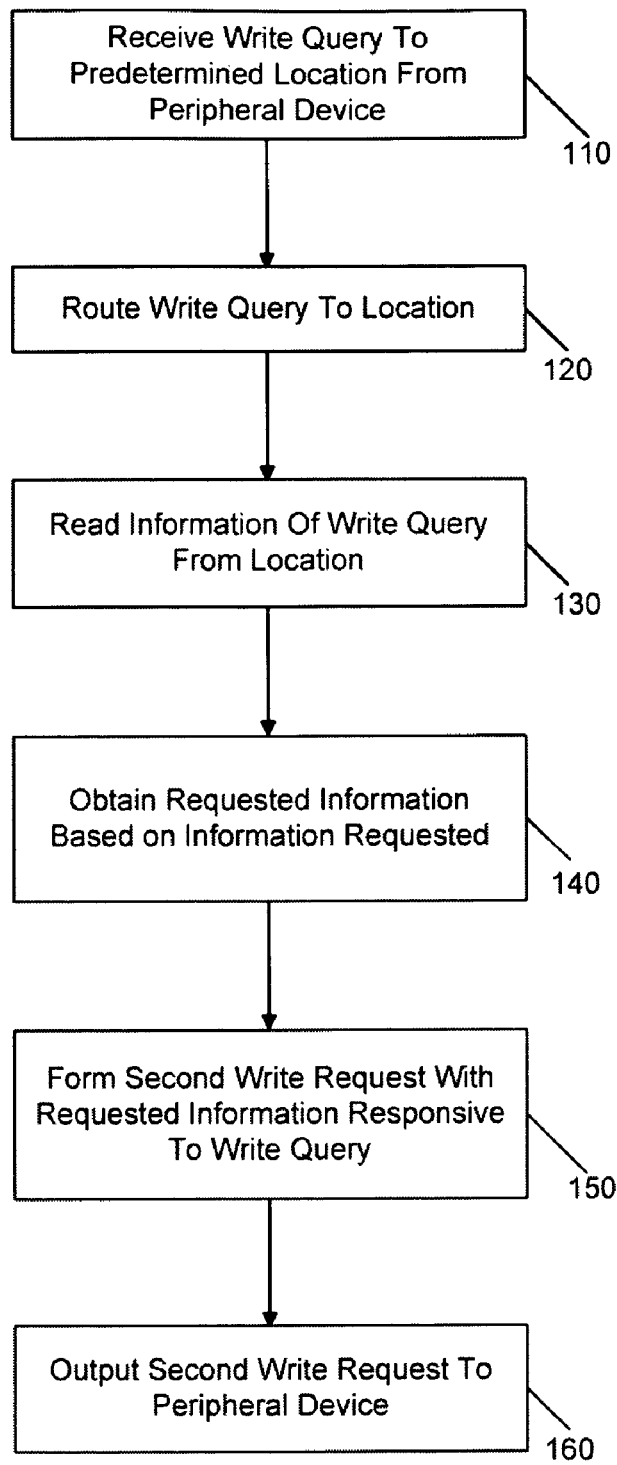
FIG. 1 is a flow diagram of a method in accordance with one embodiment of the present invention.

Referring now to FIG. 1, shown is a flow diagram of a method in accordance with one embodiment of the present invention. As shown in FIG. 1, method 100 may be performed by a processor complex to receive a write request and handle it accordingly. As shown in FIG. 1, method 100 may begin by receiving a write query to a predetermined location (block 110). For example, an interface of the processor complex may receive the write request from an interconnect that is coupled between the processor complex and a peripheral device such as a PCH. This write request may be a RAVDM write to a predetermined bus/device/function (BDF & BAR) along with an offset. Still further, in addition to this address information for the write request, the request may further include data, which may or may not be used, as described further below. As one example, the BDF/Bar and offset may be used to identify a queue within the processor complex in which the request is to be stored, for example, a vendor defined message (VDM) queue.

Still referring to FIG. 1, based on this location information the write request may be routed to that location (block 120). Thus for example the write request may be forwarded through various circuitry of the processor complex to the write queue.

Later, the information of the write query may then be read from the targeted location (block 130). For example, the entry of the VDM queue for the write request may be processed when it reaches the top of the queue. This information may be used to handle the write request from the peripheral device as if it were a read request to access desired information of the processor complex. For example, the offset information that is in the entry may be used to indicate from where the requested information is to be obtained. Accordingly, the desired information may be obtained from that location based on the information requested (block 140). While the scope of the present invention is not limited in this regard, as one example, this offset may predetermine the information to be obtained. In such implementations, the offset may operate to trigger microcode or other hardware, software or firmware to obtain the desired information. This information may correspond to one or more of a set of configuration registers present in the processor complex. Such configuration registers may include a processor ID register, one or more capabilities registers that include information regarding the enabling or disabling of various processor features, bus speeds or so forth. As will be discussed below, other manners of obtaining information may be implemented using data received with the write query.

Next, when this request information has been obtained, a write request that is thus responsive to the incoming write request may be formed (block 150). As one example, this write request may be a similar RAVDM message to write the obtained information back to the peripheral device. Thus, at block 160 the write request may be output from the processor complex to the requesting device. Alternatively, at block 160 the write request may be output from the processor complex to a different device determined via a CPU complex register. Accordingly, this write request acts as a response to the incoming write query. Thus the multiple write-write transactions have the same effect as an incoming read request and associated completion message back to requesting device, without the complexities of ordering requirements, dependencies, additional internal datapath complexities and so forth of a given communication protocol. While described with this particular implementation in the embodiment of FIG. 1, the scope of the present invention is not limited in this regard.

Embodiments can be implemented in many different systems and processor types. However, certain implementations may be used in connection with a platform having a processor complex, which may be a single die integrated circuit including multiple processor cores, caches, associated logic, memory controller, interface controller and so forth.

Figure 2:
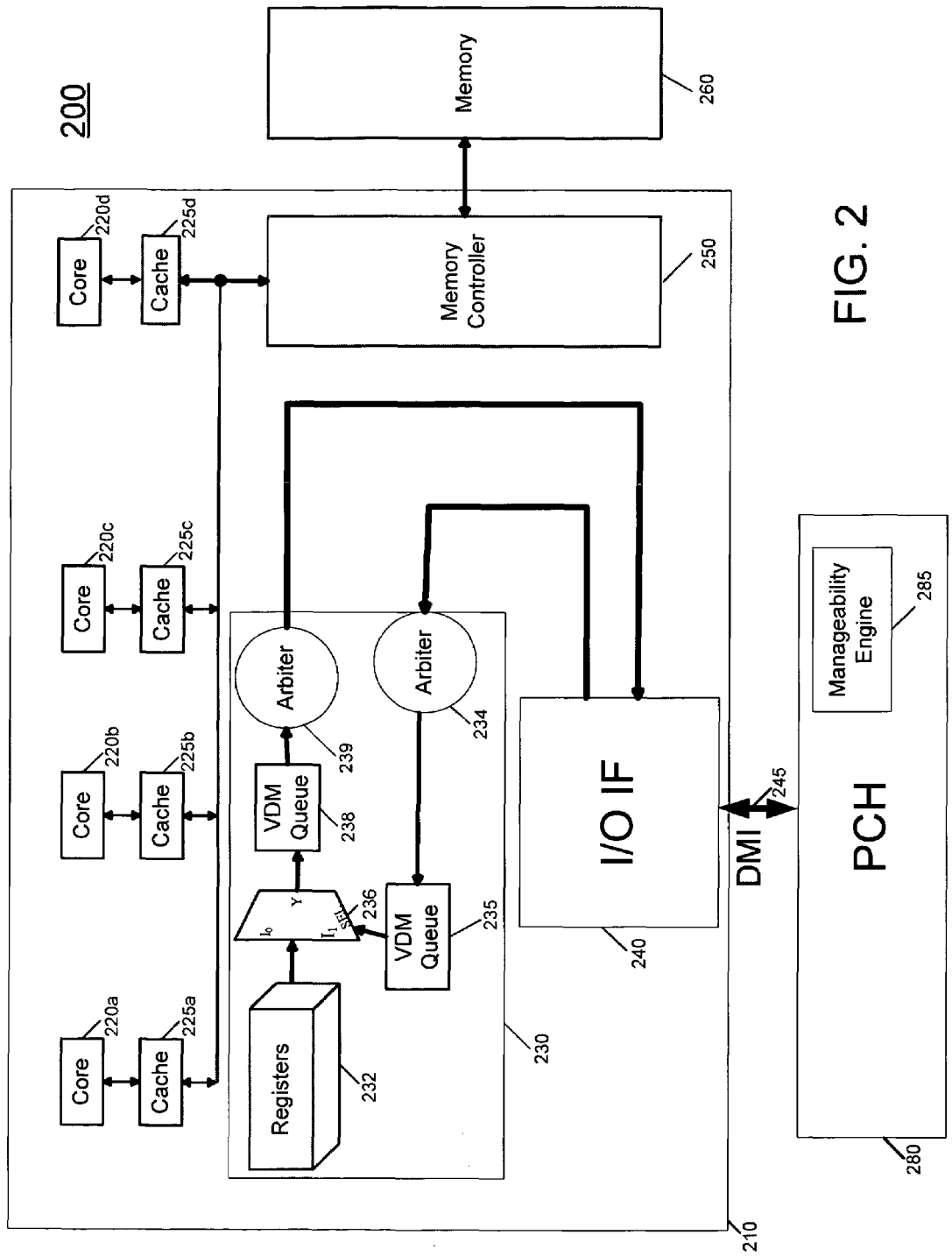
FIG. 2 is a block diagram of a portion of a system in accordance with one embodiment of the present invention.

Referring now to FIG. 2, shown is a block diagram of a portion of a system in accordance with one embodiment of the present invention. As shown in FIG. 2, system 200 includes a processor complex 210 that is coupled to a memory 260 which, in one embodiment may be dynamic random access memory (DRAM), and a PCH 280. As shown in FIG. 2, processor complex 210 may include a plurality of cores $220_a$-$220_d$ (generically core 220). Each core may be associated with a corresponding cache memory $225_a$-$225_d$ (generically cache 225). In addition, processor complex 210 includes uncore logic 230, which may include various logic of the processor that is not resident in the cores such as certain interface and control logic. Also present within processor complex 210 is an input/output (I/O) interface 240 that provides an interface to an interconnect 245, which in one embodiment may be a direct media interface (DMI) or another point-to-point interconnect that is coupled between processor complex 210 and PCH 280. In addition, processor complex 210 further includes a memory controller 250 that provides an interface between the complex and memory 260. While shown with these limited components for ease of illustration understand that additional components may be present within processor complex 210, such as fixed function units, other processing units and so forth.

As further shown in FIG. 2, uncore logic 230 may include various components that may aid in handling of write-write transactions. More specifically, information that may be requested by a peripheral device may be present in a set of configuration or memory mapped registers 232. As described above, such registers may include various information regarding the identification and capabilities of processor complex 210. When a request that is received by uncore logic 230 via an arbiter 234, it is stored in a vendor defined message (VDM) queue 235. When this entry of the queue reaches the top or head of the queue, uncore logic 230 obtains the information from registers 232 and sends it through a multiplexer 236, after which it is then queued for storage in a VDM queue 238. When output to an arbiter 239, a write request message including the desired information is arbitrated with other outgoing requests. Note that in the illustration of FIG. 2, only a single input to arbiters 234 and 239 is shown. However understand that in various implementations these arbiters may be configured to arbitrate among various incoming requests received from different cores, logic, interfaces and so forth.

Thus when an incoming RAVDM write query is received from PCH 280 (and more particularly from a manageability engine 285 within), the requests may be provided through I/O interface 240 to uncore logic 230 for handling. Then, responsive to this query a corresponding write query may be transmitted from uncore logic 230 with requested information for transmission through I/O interface 240 back to PCH 280. While shown with this limited detail in the embodiment of FIG. 2 for ease of illustration, understand the scope of the present invention is not limited in this aspect.

Figure 3:
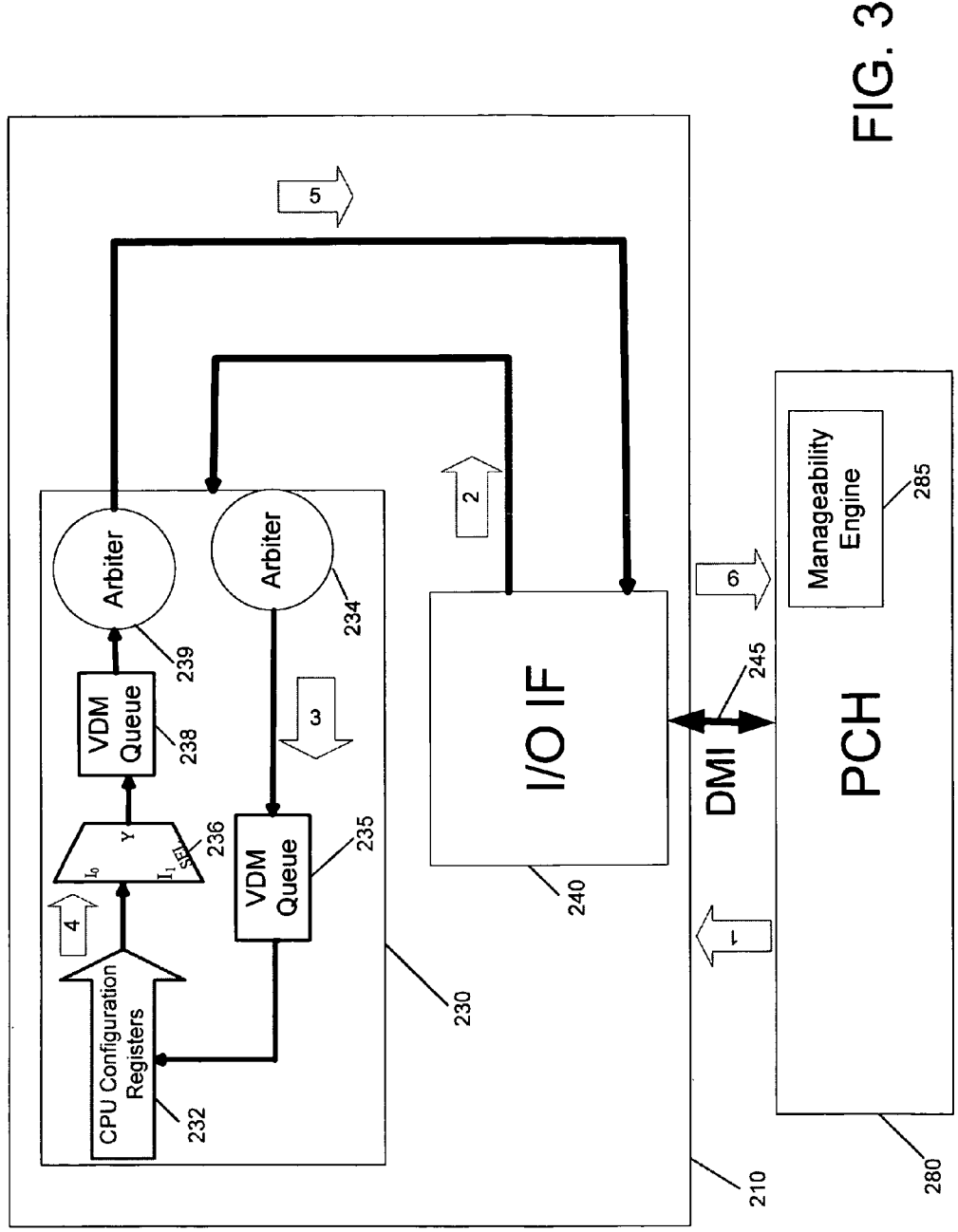
FIG. 3 is a block diagram of a processor complex in accordance with an embodiment of the present invention.

Referring now to FIG. 3, shown is a further illustration of a processor complex in accordance with an embodiment of the present invention. As shown in FIG. 3, further details regarding uncore logic 230 are provided. Specifically, FIG. 3 shows a data flow of write-write transactions in accordance with an embodiment of the present invention. The initiation of a RAVDM write query (1) from PCH 280 is received in processor complex 210 through I/O interface 240 (2) that causes writing of the query into VDM queue 235 (3). Note that at this point in the transactions, the write query from the PCH has been consumed and thus ordering rules with respect to a communication protocol (e.g., a PCIe protocol) are terminated. When the requested information of the write query is retrieved, a second write query (4) is formed that is then transmitted from uncore logic 230 (5) and through I/O interface 240 to PCH 280 (6). It is noted that this second write request is an independently generated and ordered transaction such that no dependencies or ordering issues exist with respect to the previous write transaction.

In other implementations, rather than receiving a write request that causes obtaining and sending of responsive data from a predetermined location (based on bus/device/function/bar and offset), other implementations may provide a more flexible manner for handling write-write transactions. For example, a RAVDM write with data may be received. As described above, this data may be stored, e.g., in a VDM queue. When accessed from the VDM queue, the data may be used as an index for information to be written back to the peripheral device. Note that this index may directly access information or may be used in connection with a doorbell mechanism, further described below. In yet other embodiments, the data received with a write query can be used, operated on (e.g., incremented, encrypted or so forth) and returned in the response write query. For example, in one such implementation a processor complex may receive a ping signal with a first value (e.g., a value of one). Then when transmitting the corresponding write query, this data value may be incremented and returned with a value of two to a requesting peripheral device. Note that in some implementations such process may occur in reverse, namely where the processor complex sends the ping signal and the peripheral device sends a ping return with the updated data value.

Still further, in some embodiments it is possible to receive multiple write requests from a peripheral device and based on these requests obtain data from locations indicated by the write requests themselves. That is, instead of the predetermined transfer of specific configuration or other information responsive to a single write request to a predetermined BDF/ BAR and offset, other implementations may use a so-called doorbell register to access information indicated by one or more write requests. As one such example, a first write request from a peripheral device may include a BDF/BAR and offset to this doorbell register which is written with data that may contain information regarding the desired response from the processor complex. For example, the data may include information regarding a response BDF/Bar and offset, information source (e.g., fuses, registers, hidden registers or so forth), an indication of the amount of data to return, attributes such as routing hints and action to be taken or so forth. Such actions may be to take an action on triggering write data. For example, the return data may be encrypted, a data value sent with the write request may be incremented and returned with the corresponding reply write request, or another action may be performed, e.g., a requested processor action, which upon completion may cause the reply write request to be sent. Such information may be sent in multiple write requests, where the second or later request triggers the doorbell register in which the data of an earlier write request is stored.

Figure 4:
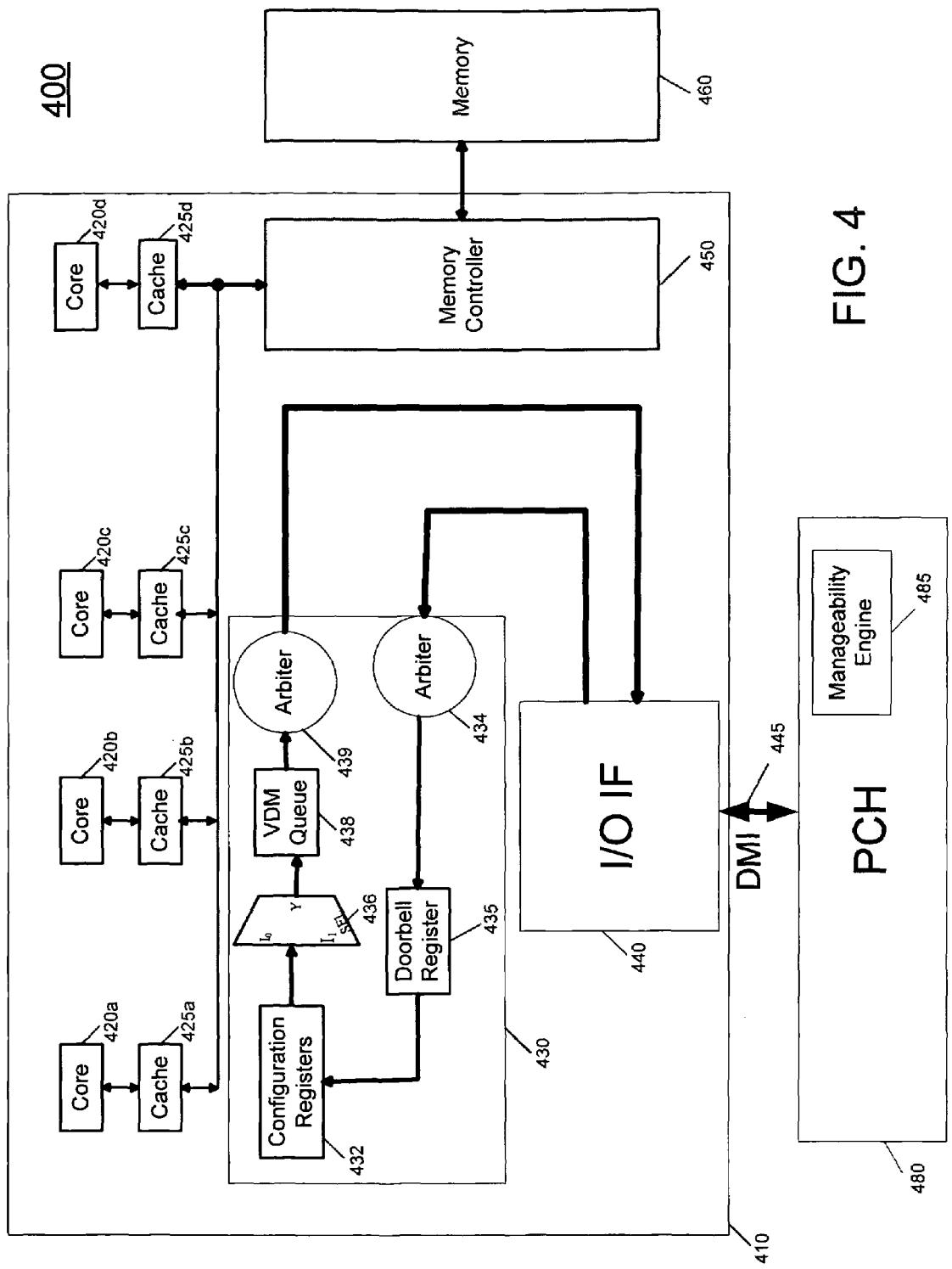
FIG. 4 is a block diagram of a processor complex in accordance with another embodiment of the present invention.

Referring now to FIG. 4, shown is a block diagram of a processor complex in accordance with another embodiment of the present invention. As shown in FIG. 4, system 400 includes a processor complex 410. Processor complex 410 may include similar components to that of FIG. 2, namely cores 420a-420$_d$, caches 425$_a$-425$_d$, uncore logic 430, an I/O interface 440, and an MCH 450. However, in this implementation uncore logic 430 includes a doorbell register 435 that is configured to receive an incoming write request from PCH 480 through arbiter 434. After storage of the initial data from the first write request, a second write transaction from PCH 480 may access this information and use it as an index to obtain information from a particular one or more configuration registers 432. In turn, the information may be sent through multiplexer 436 and stored in VDM queue 438, until it is sent from arbiter 439 to interface 440.

Figure 5:
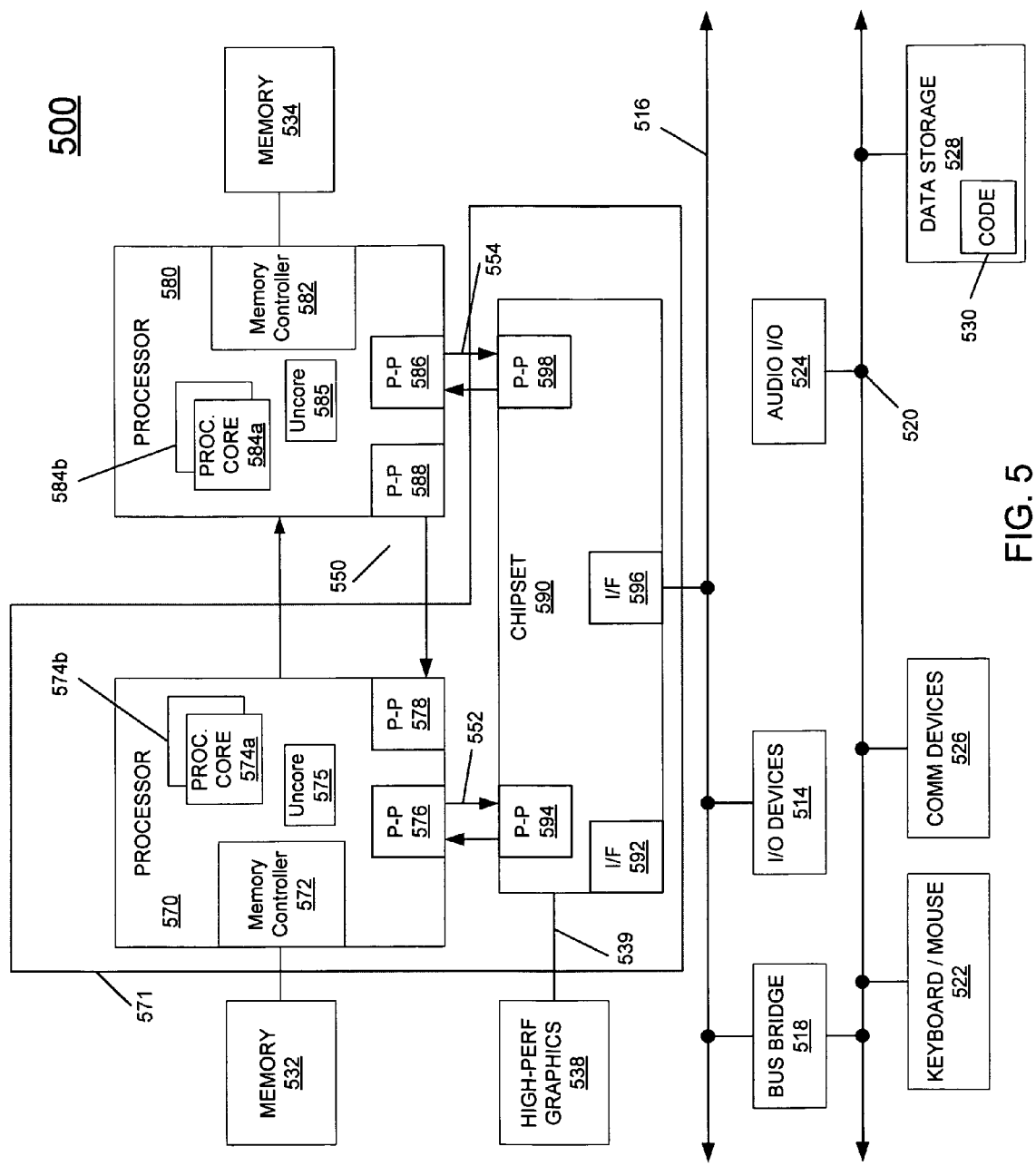
FIG. 5 is a block diagram of a system in accordance with one embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a processor complex 571 including a first processor 570 and a chipset 590. As shown in FIG. 5, first processor 570 and a second processor 580 are coupled via a point-to-point interconnect 550. As shown in FIG. 5, each of processors 570 and 580 may be multicore processors, including first and second processor cores (i.e., processor cores 574a and 574b and processor cores 584a and 584b). Each processor may further include uncore logic 575 and 585, which may handle an incoming write request from a peripheral device as if it were a read request to obtain and provide configuration information of the processor.

Still referring to FIG. 5, first processor 570 further includes a memory controller 572 and point-to-point (P-P) interfaces 576 and 578. Similarly, second processor 580 includes a memory controller 582 and P-P interfaces 586 and 588. As shown in FIG. 5, memory controllers 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 5, chipset 590 includes P-P interfaces 594 and 598.

Furthermore, chipset 590 includes an interface 592 to couple chipset 590 with a high performance graphics engine 538. In turn, chipset 590 may be coupled to a first bus 516 via an interface 596. As shown in FIG. 5, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Referring now to FIG. 6, shown is a block diagram of a system in accordance with another embodiment of the present invention. As shown in FIG. 6, system 400' may be a front side bus (FSB) system, or other processor interconnect-based system in which a processor 420 is coupled to a chipset 410 including uncore logic 430 via a processor interconnect 415. In other respects system 400' may be adapted similar to that of FIG. 4. Note however the presence of an external graphics card 465, also coupled to chipset 410.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a processor complex including:
      an interface to communicate with a peripheral device via an interconnect, the interface to receive a write query from the peripheral device to perform a write operation to a first location of the processor complex, wherein the write query includes an indicator to request vendor specific information of the processor complex;
      a logic coupled to the first location, wherein the logic is to access the vendor specific information responsive to the write query and to generate a second write query to transmit the vendor specific information to the peripheral device, wherein ordering rules of a communication protocol of the interconnect terminate with respect to the write query when it is received in the logic, and the second write query is independent of the write query with respect to the ordering rules;
      a plurality of cores coupled to the logic to perform operations responsive to instructions; and
      a memory controller coupled to the logic to communicate with a memory.

2. The apparatus of claim 1, wherein the logic is to arbitrate between multiple incoming requests and to select the write query for storage in the first location.

3. The apparatus of claim 1, wherein the first location is a vendor defined message queue, and wherein the logic is to access at least one register of the processor complex to obtain the vendor specific information when an entry of the vendor defined message queue corresponding to the write query is at a head of the vendor defined message queue.

4. The apparatus of claim 1, wherein the vendor specific information is stored in one or more configuration registers, and wherein the communication protocol does not provide for a read request from the peripheral device to access the one or more configuration registers.

5. The apparatus of claim 1, wherein the logic comprises uncore logic including an input arbiter to receive incoming requests and to select one of the incoming requests for input into a first queue.

6. The apparatus of claim 5, wherein the uncore logic further comprises a multiplexer to select the vendor specific information for output to a second queue responsive to the write query.

7. The apparatus of claim 6, wherein the uncore logic further comprises an output arbiter to receive output requests and to select one of the output requests to send to the interface.

8. The apparatus of claim 1, wherein the logic is to generate the second query responsive to the write query received from a manageability engine of the peripheral device.

9. A system comprising:
a processor complex including an interface to communicate with a peripheral device via an interconnect, a plurality of cores to perform operations responsive to instructions, and a memory controller to communicate with a memory, the interface to receive a write request from the peripheral device to write information to the processor complex, wherein the write request is to be handled by the processor complex as if it were a read request such that the processor complex is to transmit a second write request to the peripheral device that includes vendor specific information of the processor complex;
the peripheral device coupled to the processor complex via the interconnect, wherein the peripheral device is to generate the write request on initialization of the system; and
the memory coupled to the processor complex.

10. The system of claim 9, wherein the processor complex further comprises a logic to access the vendor specific information responsive to the write request and to generate the second write request, and wherein ordering rules of a communication protocol of the interconnect terminate with respect to the write request when it is received in the logic and the second write request is independent of the write request with respect to the ordering rules.

11. The system of claim 10, wherein communications on the interconnect are according to a Peripheral Component Interconnect Express (PCIe) protocol, and wherein the PCIe protocol does not provide for a read request from the peripheral device to access vendor specific information of the processor complex.

12. A system comprising:
a processor complex including:
an interface to couple to a peripheral device via an interconnect, the interface to receive a first write query from the peripheral device to perform a write operation to a first location of the processor complex, the first write query to request vendor specific information of the processor complex;
a logic coupled to the first location to access the vendor specific information responsive to the first write query and to generate a second write query to transmit the vendor specific information to the peripheral device, wherein the first and second write queries avoid data dependency and ordering rules of a communication protocol of the interconnect for a read request; and
a plurality of cores coupled to the logic to perform operations responsive to instructions;
a memory controller coupled to the logic to communicate with a memory; and
the memory coupled to the processor complex.

13. The system of claim 12, wherein the logic is to arbitrate between multiple incoming requests and to select the first write query for storage in the first location.

14. The system of claim 12, wherein the first location is a vendor defined message queue, and wherein the logic is to access at least one register of the processor complex to obtain the vendor specific information when an entry of the vendor defined message queue corresponding to the first write query is at a head of the vendor defined message queue.

* * * * *